United States Patent Office 2,962,454
Patented Nov. 29, 1960

1

2,962,454

SULFONATING REAGENT AND METHOD OF MAKING AND USING THE SAME IN THE PREPARATION OF CATION EXCHANGE MEMBRANES

Wayne A. McRae, Lexington, and Samuel S. Alexander, Boxboro, Mass., assignors to Ionics, Incorporated, Cambridge, Mass., a corporation of Massachusetts No Drawing. Filed Dec. 5, 1956, Ser. No. 626,300

9 Claims. (Cl. 260—2.2)

This invention relates to sulfonating reagents and to methods of making and using the same. It also relates to methods of using such reagents to sulfonate organic materials having hydrolyzable components and using such sulfonating reagents to make electrically conductive solid, unfractured materials having ionic selectivity and substantial cation exchange capacity; to methods of making cation exchangers and in particular to the method of making membranes which are sulfonic, synthetic, hydrous, organic, electrolytic polymers of predetermined dimensions which are or may be reinforced with imbedded fibrous organic materials especially where such fibrous materials are hydrolyzable. The membranes are preferably sulfonated polymerizates of aromatic compounds, for example, copolymers of divinyl benzene and styrene, condensation products of phenol and formaldehyde or more particularly vulcanizates of polyvinyl toluene.

Methods of sulfonating organic compounds, for example, aromatic hydrocarbons have been well known for many years. The state of this art is exhaustively reviewed in the book "Organic Chemistry of Sulfur" by Chester M. Suter, published in 1944 by John Wiley and Sons, New York. Among suitable sulfonating agents for aromatic compounds are concentrated sulfuric acid, oleum (sometimes called fuming sulfuric acid), sulfur trioxide and various "salts" of sulfur trioxide with Lewis bases such as amines and ethers. These "salts" are very much weaker sulfonating agents than sulfur trioxide itself. For example the pyridine salt is only successful in sulfonating very reactive materials such as polyhydric phenols.

Unmodified solutions of free sulfur trioxide are extremely reactive and corrosive and are difficult and dangerous to use owing to the high vapor pressure of sulfur trioxide. They have a tendency to form large amounts of sulfones. On the other hand, sulfuric acid, oleum and chlorsulfonic acid have undesirable side reactions, owing primarily to the presence of the hydroxyl groups. In addition, chlorsulfonic acid gives sulfonyl chloride substituents if used in large excess, thus requiring additional process steps. If not used in large excess a considerable quantity of sulfones are produced. Furthermore, considerable excesses of these reagents are required in synthesis, the excess appearing as contaminant in the product requiring the separation and disposal of large quantities of acid.

Recently issued patents to Juda and McRae, Pat. No. 2,636,851, and Clarke, Pat. No. 2,731,411, describe synthetic polymeric ion exchange membranes wherein reinforcing fabrics, woven and non-woven, are sometimes employed for enhancing structural strength, flexibility and

2 durability of synthetic polymeric membranes. It was appreciated that this reinforcing medium should have a high tear strength, a substantial void volume, and should have as good chemical and heat resistance as the polymer. For synthetic sulfonic cation membranes based on aromatic polymerizates, glass fabrics appeared to be the best qualified reinforcing material for membranes prepared by the sulfonation of said polymerizates. The use of organic fabrics prepared from hydrolyzable polymers e.g. acrylic or polyester fibers proved unsatisfactory with concentrated $H_2SO_4$ or oleum owing to the instability of said fabrics under sulfonation conditions. In most cases such reinforced polymerizates are completely disintegrated during sulfonation (whether at room temperature or other temperatures) before they are sufficiently sulfonated to give the selectively permeable electrolytically conductive structures required. In a few cases the sulfonated reinforced polymerizates are recovered from the sulfonation but in such a weak and fragile condition that they disintegrate merely on standing for a few hours in water. It has been found that tightly woven heavy fabrics prepared from multifilaments of copolymers of vinylidene chloride and vinylchloride under the trade name "Saran" may be successfully sulfonated with concentrated sulfuric acid or oleum to give hydraulically impermeable structures. Owing to the tight heavy fabric construction these membranes have a high electrical resistance and are not useful for most practical processes. Attempts to prepare such membranes on "Saran" fabrics of either multifilament or staple fibers, having about 50% voids (required to give low resistance), that is, having loosely woven substantially open structures, are universally unsuccessful in that they result in hydraulically permeable structures which are not useful for practical applications. Fibers of polyperfluoroethylene marketed under the trade name "Teflon" may be successfully used. However the cost of "Teflon" fibers is necessarily several times that of other organic fibers. It is apparent that "Teflon" fibers are impracticable for membranes intended for low cost processes such as demineralization of water. Glass fabric supporting materials and other inorganic fibers are satisfactory for preparing reinforced sulfonated polymerizates but the flex-life, stability in acid and basic solutions and mechanical durability under field conditions are also unsatisfactory for low cost uses.

The attack of sulfonating reagents such as sulfuric acid or oleum on acrylic, polyester, polyether and other organic fibers is believed to be due to the fact that they are very strong protonic acids. Many organic fibers may of course be dehydrated, hydrolyzed, esterified, oxidized, or sulfonated by sulfuric acid or oleum. This invention however, is concerned primarily with organic fibers which are not readily oxidized, sulfonated, dehydrated (charred) or esterified by sulfuric acid or oleum but may be subject to hydrolysis. In general, suitable fibers are those which are not degraded by non-protonic strong Lewis acids. Suitable compounds or polymers for treatment with the new sulfonating reagent are those which react with non-protonic strong Lewis acids well known, per se, without substantial degradation. Examples of such non-protonic strong Lewis acids are (a) an equimolar mixture of anhydrous aluminum chloride and isopropyl chloride, and (b) known modified solutions of sulfur trioxide such as an equimolar mixture of sulfur trioxide and isopropyl ether. Such fibers for example, include copolymers of acrylonitrile; copolymers of vinylidene dicyanide; condensation products of phthalic anhydride and ethylene glycol; and cyanoethylated cellulose, etc. all belonging to a class consisting of nitriles and esters. The most common non-protonic sulfonating agent is sulfur trioxide (marketed in an inhibited form under the trade name "Sulfan"). Attempts to utilize this sulfonating reagent of the present invention in solution in chlorinated hydrocarbons show that it does not attack many organic fibers which sulfuric acid attacks although it sulfonates aromatic polymerizates at a rate about 10 times greater than the latter and results in sulfone formation. This reactivity however, also leads to over sulfonation and sloughing off of the exterior portions of the polymerizates before the interior portions are completely reacted. Dilution and the use of lower temperatures does not markedly diminish this effect. Solutions of sulfur trioxide with various known Lewis base modifying agents are unsuccessful in preparing membranes having the desired characteristics, namely: (a) uniform sulfonation to capacities of from about 2.5 to about 3.5 meq. per gram of bone dry sulfonated polymerizate, and (b) mechanical strength and low hydraulic permeability, with low cost readily available organic fabrics in open construction.

For instance, solutions of sulfur trioxide modified with pyridine or trimethyl amine are too weakly sulfonating to give substantial capacities. Dichloroethyl ether as a modifier gives capacities which are just below the optimum range but the modifier is attached by sulfur trioxide so that the useful life of the reagent is impractically short. Dioxane (diethylene oxide) also gives capacities just below the desired range and its sulfur trioxide complexes are somewhat more stable. However, much of the complexes formed are of limited solubility in inert solvents. Solutions prepared from low concentrations of sulfur trioxide and dioxane to avoid the formation of precipitate have no appreciable sulfonating power for example, polyvinyl aromatic polymerizates. The aliphatic ethers from ethyle to amyl have been studied and it was found that ethyl gives the highest sulfonation capacity which however is not better than that obtained with dioxane. By such investigations it has been established that known modifiers for sulfur trioxide are generally too strongly modifying or give solutions which are unstable on a long term basis in storage.

It has now been found that solutions of sulfur trioxide modified by aromatic carboxylic acids such as benzoic acid or its nuclearly substituted alkyl or halogen derivatives or other derivatives preferably having ionization constants in the range of about $1 \times 10^{-5}$ to about $10 \times 10^{-5}$, are highly effective sulfonating agents for sensitive materials such as polymerizates of divinyl benzene and styrene containing acrylic or polyester polymers. Surpisingly such modified solutions have been found to have a high sulfonating power intermediate between known modifications of sulfur trioxide and unmodified solutions of sulfur trioxide. The vapor pressure of sulfur trioxide over benzoic acid modified solutions is much less than over unmodified solutions of sulfur trioxide but greater than over solutions of sulfur trioxide modified in previously known ways. The benzoic acid modified solutions are apparently stable indefinitely at room temperatures or even at 40 or 50° C. By the use of such a reagent it has been possible to prepare cation exchange membranes from, for example, divinyl benzene-styrene copolymerizates and other polymerizates reinforced with acrylic, polyester and other fibers which membranes are hydraulically impermeable, mechanically durable, and have a high uniform sulfonation capacity in the range of 2.5 to 3.5 milliequivalents per bone dry gram of sulfonated polymerizate.

Ionization constants of some substituted aromatic carboxylic acids, for example benzoic acids, are given in Table I.

TABLE I

*Ionization constants of some substituted benzoic acids*

| Acid | Ionization Constant |
| --- | --- |
| benzoic | $6.3 \times 10^{-5}$ |
| meta-bromo benzoic | $15 \times 10^{-5}$ |
| para-bromobenzoic | $11 \times 10^{-5}$ |
| paratertiary butylbenzoic | $4.0 \times 10^{-5}$ |
| meta-chlorobenzoic | $15 \times 10^{-5}$ |
| para chlorobenzoic | $10 \times 10^{-5}$ |
| paraisopropyl benzoic (cuminic) | $4.4 \times 10^{-5}$ |
| para ethyl benzoic | $4.4 \times 10^{-5}$ |
| meta fluorobenzoic | $14 \times 10^{-5}$ |
| para fluorobenzoic | $7.2 \times 10^{-5}$ |
| meta hydroxybenzoic | $8.3 \times 10^{-5}$ |
| para hydroxybenzoic | $3.3 \times 10^{-5}$ |
| ortho methoxybenzoic | $8.1 \times 10^{-5}$ |
| meta methoxybenzoic | $8.2 \times 10^{-5}$ |
| para methoxybenzoic | $3.4 \times 10^{-5}$ |
| beta naphthoic | $6.9 \times 10^{-5}$ |
| meta phenoxy benzoic | $11 \times 10^{-5}$ |
| para phenoxy benzoic | $3 \times 10^{-5}$ |
| ortho methyl benzoic (ortho toluic) | $1.2 \times 10^{-5}$ |
| meta methyl benzoic (meta toluic) | $5.4 \times 10^{-5}$ |
| para methyl benzoic (para toluic) | $4.2 \times 10^{-5}$ |
| 4-hydroxy, 3-methoxy benzoic (i.e. Vanillic) | $3.0 \times 10^{-5}$ |

An object of the present invention is to prepare and use modified solutions of sulfur trioxide which are more powerful and yet more stable than those previously known.

Another object is to prepare cation exchange membranes of satisfactory structural strength and improved field life. Another object is to obtain high capacity cation membranes wherein low cost synthetic organic fibers are employed as supporting materials. Another object is to prepare cation membranes having organic fibers imbedded within synthetic organic polymerizates which upon sulfonation provide stable and improved membranes. Further objects are improved sulfonation homogeneity, greater tolerance of temperature variations for the sulfonation reaction, prevention of undesirable side reactions and production of high capacities in stable cation exchange membranes.

In accordance with U.S. Patent No. 2,731,411, issued on January 17, 1956, one method of making cation exchange membranes employed in electrodialysis cells is shown to comprise essentially mixing in proper proportions mono and divinyl aromatic compounds and a polymerization catalyst in a solvent therefor and pouring the same onto a mat of a glass fabric material which is sandwiched between two glass plates. This cast after heating at 85° C. for 4 hours and then cooling to 25° C. is removed from the plates. A translucent sheet about 40 mils thick is obtained. During the polymerization it is apparent that evaporation of solvent is substantially prevented in this procedure. After trimming off the edges of this sheet and discarding the same, a sheet material hereinafter termed a "board" is obtained which may be basis for subsequent preparation of cation or anion exchange membranes in accordance with the character of the reactive ion-exchange groups attached thereto.

Another type of polymerizate such as a condensation polymer may also be employed to make the "boards." This type of polymer includes condensation products of aldehydes with such compounds as phenols, alkoxy benzenes, etc., well known per se, as fully disclosed in U.S. Patent No. 2,730,768. Other suitable boards are prepared by vulcanizing polymers of styrene having nuclear primary or secondary alkyl substituents as fully set forth in U.S. Patent No. 2,731,411 filed on even date or by vulcanizing copolymers of butadiene and styrene or their substituted products as fully set forth in U.S. Patent No. 2,800,445.

For preparing cation exchange membranes the prepared board is according to known art sulfonated by reacting the same under proper conditions with suitable sulfonating agents which include sulfur trioxide, preferably dissolved in a suitable solvent such as ethylene dichloride or with an excess of concentrated sulfuric acid (with or without an activator such as silver oxide) or oleum. The boards may also be chlorsulfonated by reacting with chlorosulfonic acid. The board is treated with the sulfonating agent at room temperature, or if desired, at lower or higher temperatures.

Although glass reinforced membranes prepared by such procedures have proven satisfactory for many electrolytic uses, some disadvantages have been found in resistance to repeated flexure, ability to withstand the corrosive action of caustics, acids, etc.

In addition low cost organic fabrics, woven and unwoven, were effectively employed in place of glass as reinforcing fabrics for the preparation of boards. These were very satisfactory for example, for anion membranes and carboxylic cation membranes. However, these organic fiber-supported polymerizates would almost instantly disintegrate when sulfonated in the manner of the prior art noted above (except those prepared on fibers of vinylidene chloride having excessively tight construction) and could not withstand the action of the sulfonating agents employed in the known art. For this reason many of these organic fabrics have been heretofore used only for making anion exchange membranes, or carboxylic cation exchange membranes.

The present invention is directed to a new sulfonating reagent which comprises a cooperative mixture of sulfur trioxide and aromatic carboxylic acids such as benzoic acid or its nuclearly substituted derivatives, preferably in solution in an inert organic solvent. Suitable and preferable compounds of the latter group are toluic, ethyl benzoic, isopropyl benzoic, tertiary butyl benzoic and chlorobenzoic acids.

The present invention is also directed to the use of this sulfonating agent for cation exchange membranes which have reinforcing organic fabric materials imbedded therein and which preferably comprise copolymerizates of a divinyl benzene and a major proportion of monovinyl benzenes. Nuclearly substituted derivatives of benzoic acid include such compounds as chlorobenzoic acid, and alkyl benzoic acids, such as toluic acid, etc. Inert organic liquids include for example ethylene dichloride, carbon tetrachloride, perchloroethylene, etc.

Suitable organic reinforcing fabrics include such materials as "Dacron" (a copolymer of ethylene glycol and terephthalic acid); "Dynel" (a copolymer of vinyl chloride and acrylonitrile); "Orlon" (a polymer principally of acrylonitrile); "Saran" (a copolymer of vinylidene chloride and vinyl chloride); "Teflon" (a polymer of perfluoroethylene); "Darlan" (a polymer principally of vinylidene cyanide); "Acrilan" a polymer principally of acrylonitrile); "Azotan" (cyanoethylated cotton); "Vincel" (a polymer principally of vinyl chloride), etc. These materials may be woven or non-woven, for example, in the form of mats and felts.

In general suitable organic fabrics of low cost contain as principal components acrylonitrile, vinylidene cyanide, vinyl chloride, vinylidene chloride, cyanoethylated cellulose, cellulose alkyl ethers such as methyl or ethyl cellulose, cellulose esters, such as cellulose acetate, cellulose propionate or cellulose butyrate, or polyesters, including the alkyd type such as terephthalic acid ethylene glycol condensation products, etc.

While various known complexing and moderating agents for sulfonating reagents, have formerly been employed for various purposes, all such additives have proven ineffective in the instant case to produce a stable sulfonated divinyl polymeric matrix based on divinyl benzene-monovinyl benzene copolymerizates reinforced with low cost organic fibers and in the form of an ion exchange membrane with high capacity and high mechanical strength.

The specific requirement for the new sulfonating agent is that it be strong enough to sulfonate boards of the divinyl benzene-monovinyl benzene copolymerizates noted above to result in ion exchange capacities of 2.5 to 3.5 milliequivalents per gram of dry resin and yet sufficiently moderate in reaction to prevent attack and disintegration of the low cost organic backing or supporting fabric. These conditions are fully met with a solution of liquid sulfur trioxide and an aromatic carboxylic acid such as benzoic acid (or its nuclearly substituted derivatives) in an inert solvent such as ethylene dichloride wherein the liquid sulfur trioxide is present in the range from about 1 to about 15 percent by weight in solution preferably about 3 to about 10 percent by weight, the benzoic acid (or its nuclearly substituted derivatives), in a molar ratio to liquid sulfur trioxide from about one to about two. The phrase "liquid sulfur trioxide" is used herein to distinguish from the less preferable polymeric solid sulfur trioxide.

The following examples have been selected for purposes of illustration and are not presented to suggest limitations not previously described and not included in the appended claims.

*Example 1.—Preparation of sulfonating reagent*

Fourteen pounds (3.5 liters) of liquid sulfur trioxide was introduced slowly into a tank containing twenty gallons of ethylene dichloride and 26 pounds of benzoic acid. This addition was accompanied by cooling and stirring, as the reaction is exothermic. The temperature was maintained below 25° C. The operation was completed in fifteen minutes. The molar ratio of benzoic acid to sulfur trioxide was 1.2 to 1, respectively. This mixture was found to be completely stable and could be stored indefinitely at room temperature with an airtight cover for use as required.

PREPARATION OF CATION EXCHANGE MEMBRANES

*Example 2.—Sulfonated copolymer of divinyl benzene and styrene*

A solution was prepared containing 50 parts by weight of 50–60 percent divinyl benzene of commerce (containing by actual analysis 53 mol percent of divinyl benzene and about 40 mol percent ethyl vinyl benzene), 50 parts by weight of styrene, 48 parts by weight of diethyl benzene and 0.3 part of benzoyl peroxide. The mixture was cast between two glass plates while surrounding a reinforcing material of woven "Dynel" cloth fabric of open construction having a weight of 9.1 ounces per square yard and a Frazier porosity of 50. The casts were heated at 80° C. for three hours under non-evaporative conditions. The casts were then cooled to room temperature and leached in ethylene dichloride. Thirty casts measuring 19" x 21½" were prepared in this manner.

Fifteen of these boards were rinsed in ethylene dichloride for one-half hour, then immersed in the sulfonating reagent prepared in Example 1 for twenty hours at a temperature of 18° C. At the end of this time they were removed and rinsed again for one-half hour in ethylene dichloride, then one hour in methanol, one hour each in 5 N, 2.5 N, 1.3 N, and 0.6 N sodium chloride, and finally for two hours in water. These membranes upon testing gave an ion exchange capacity of 3.3 meq. per dry gram of polymeric material (less the weight of Dynel); a resistance of 18 ohms per square centimeter; 43 percent water based upon the resin, and retained their effectiveness as cation exchange membranes indefinitely. They were mechanically strong and rugged and were hydraulically impermeable.

On the other hand, five of the above boards were plunged into 98 percent sulfuric acid (containing 0.1 percent silver oxide), and were reacted at 22° C. for 17 hours. The boards were completely disintegrated by this treatment. Boards polymerized in the same way on a fabric woven of glass staple fibers were similarly treated with sulfuric acid. These boards were recovered in good condition and were leached first in 50% sulfuric acid, then successively in 25%, 12%, 6% and 3% sodium chloride solution and finally in tap water. They were found to be smooth and hydraulically impermeable, to have a capacity of 3.2 milliequivalents per gram of bone dry resin, a resistance of 13 ohms per square centimeter and a Mullen burst strength of about 200 pounds per square inch.

Four additional boards having Dynel reinforcement were immersed in a 6% solution by weight of liquid sulfur trioxide in ethylene dichloride at 40° C. and 18° C. for 4 and 20 hours, respectively. They were then leached in ethylene dichloride, successively in methanol, 5 N, 2.5 N, 1.3 N, and 0.6 N sodium chloride, and finally in water. Those reacted 4 hours had resistances of 60 ohms per square centimeter and very spalled surfaces due to sloughing off of resin. Those reacted 20 hours were so spalled as to have high hydraulic permeability.

These experiments illustrate the unhomogeneous sulfonation obtained with solutions of unmodified sulfur trioxide. Membranes of lowest resistance having smooth surfaces cannot be practically obtained from copolymerizates of divinyl benzene and styrene reinforced with high porosity fabrics by sulfonation with unmodified sulfur trioxide.

*Example 3.—Use of non-woven fabrics*

The same procedure noted in Example 2 was used to make another set of boards, but employing a non-woven mat containing 80 percent "Orlon" and 20 percent "Saran" fibers for the backing material. Five of these boards were immersed in the sulfonating reagent solution prepared according to Example 1 for a period of about twenty hours at a temperature controlled to about 4° C. Another five were immersed at 30° C. for 20 hours. All membranes were conditioned by leaching successively in methanol, 20%, 10% and 5% sodium chloride and finally in water. All the membranes produced were of excellent surface quality and produced chemical and physical characteristics approximating those under Example 2 on woven Dynel.

On the other hand, when five additional boards were immersed in a 6% solution of sulfur trioxide in ethylene dichloride for twenty hours at room temperature and removed therefrom and thoroughly leached as described above, they completely disintegrated in a matter of a few hours. In this case the mat had insufficient strength to withstand the spalling.

*Example 4.—Use of Dacron fabric*

The same procedure noted in Example 2 was used to make another set of boards, but employing a porous lightweight non-woven Dacron fabric for the backing material. Five of these boards were immersed for 17 hours in a sulfonating reagent consisting of 5% sulfur trioxide in carbon tetrachloride having 16% parachloro benzoic acid and then leached thoroughly in ethanol and then in water. All membranes were of excellent physical and chemical qualities, approximating those produced under Examples 2 and 3.

Similarly, when an additional five boards were reacted with 98 percent sulfuric acid (containing a small amount of silver oxide as accelerator) for a period of fifteen hours at room temperature, the boards were completely disintegrated.

*Example 5.—Sulfonated copolymer of vinyl toluene and acrylonitrile*

Sixty parts by weight of inhibitor free vinyl toluene and forty parts of vacuum distilled acrylonitrile were mixed with thirty parts of diphenyl, one part of lauroyl peroxide and three parts of dicumyl peroxide. The resulting mixture was cast between glass plates on cloth woven from glass staple fibers and heated at 60° C. for 15 hours. The temperature was then held at 160° C. for one hour after which the casts were cooled to room temperature. The resulting sheets were rinsed with ethylene dichloride and then immersed for 15 hours in a sulfonating reagent containing 3 percent by weight of sulfur trioxide, 8 percent by weight of 3-methylbenzoic acid in ethylene dichloride. The resulting structure was then rinsed in methanol, then successively in 4 N, 2 N, 1 N, 0.5 N sodium chloride and finally in water. The resistance of the finished membrane was about 20 ohms per square centimeter, the capacity about 2.7 milliequivalents per gram of dry resin.

This example illustrates the use of this reagent in sulfonating materials containing sensitive groups, in this case nitrile groups. The method of preparing the board in this example is the subject of U.S. Patent No. 2,800,445 issued July 23, 1957 noted above.

*Example 6.—Sulfonated condensation polymers with Orlon fabrics*

Seventy-five parts of paratertiary butylphenol, forty-seven parts of phenol, and one hundred eighty parts of an ethanolic solution of formaldehyde (the latter containing sixty parts of formaldehyde and two parts of potassium hydroxide) were mixed together, warmed to 70° C. and cast between glass plates on a woven Orlon fabric of open construction. The cast was heated at 80° C. for 20 hours, cooled to room temperature, removed from the glass plates and then rinsed thoroughly with ethylene dichloride. The resulting boards were sulfonated by immersing them for 15 hours at 0° C. in a mixture containing two percent sulfur trioxide, and six percent benzoic acid in ethylene dichloride. After this treatment the membranes were leached with ethylene dichloride, successively in methanol, 4 N, 2 N, 1 N and 0.5 N sodium chloride and finally with water. The resulting membranes had a capacity of about 3.3 milliequivalents per dry gram of resin and a resistance of about 20 ohms per square centimeter. This example illustrates the use of the reagent in sulfonating condensation polymers reinforced with hydrolyzable fabrics.

It will be apparent from the above examples that the use of the sulfonating reagent of this invention for producing cation exchange membranes from polymerizates containing organic fabric reinforcement materials therein, produces cation exchange membranes of desired physical and chemical characteristics which cannot be produced in the use of prior sulfonating reagents.

While this invention has been described and illustrated by the examples shown, it is not intended to be strictly limited thereto, and other modifications and variations may be employed within the scope of the following claims.

We claim:

1. As a sulfonating reagent, a liquid solution comprising sulfur trioxide in a chlorinated aliphatic solvent and from about one to about two mols of at least one aromatic carboxylic acid of the group consisting of those listed in Table I of the specification for each mol of sulfur trioxide.

2. As a sulfonating reagent, a liquid solution comprising sulfur trioxide in a chlorinated aliphatic solvent and from about one to about two mols of benzoic acid for each mol of sulfur trioxide.

3. The method of making cation exchange membranes of insoluable, infusible polymers in the form of a sheet having sulfonatable aromatic hydrocarbons component therein comprising: reacting said sheet with a liquid solution of sulfur trioxide and from one to about two mols of at least one aromatic carboxylic acid of the group consisting of those listed in Table I of the specification for each mol of sulfur trioxide in a chlorinated aliphatic hydrocarbon solvent.

4. In the method of making cation membranes comprising as an essential part a sulfonated polymerizate of sulfonatable aromatic hydrocarbons which method comprises (1) forming a dispersion in an inert solvent of material capable of polymerizing into said polymer, (2) curing said dispersion to the insoluble, infusible state in the presence of said solvent under conditions substantially preventive of the escape of said solvent thereby forming said polymer, (3) the step of reacting said polymer with a liquid solution of sulfur trioxide and from one to about two mols of at least one aromatic carboxylic acid of the group consisting of those listed in Table I of the specification for each mol of sulfur trioxide in a chlorinated aliphatic hydrocarbon solvent.

5. The method of making synthetic organic cation exchange membranes wherein reinforced polymerizates are sulfonated, which method comprises casting polymerizable organic compounds at least one of which is aromatic and sulfonatable, in a solvent for said compounds in sheet form around a reinforcing synthetic organic fabric material, said fabric material being a hydrolyzable organic polymer belonging to the class consisting of polynitriles and polyesters, said compounds capable on polymerization of forming a crosslinked insoluble, infusible matrix in gel relationship with said solvent, effecting polymerization under conditions substantially preventive of escape of said solvent, thereby forming a reinforced sheet, and contacting said reinforced sheet with a solution in the proportion of about one mol of sulfur trioxide and from one to about two mols of benzoic acid in an inert chlorinated aliphatic hydrocarbon solvent therefor to produce a sulfonated cation exchange membrane.

6. The method of claim 5 wherein the sulfonating reagent consists of about one to two mols of benzoic acid per mol of liquid sulfur trioxide in a chlorinated aliphatic solvent therefor.

7. The method of claim 6 wherein the chlorinated aliphatic solvent is ethylene dichloride.

8. As an article of manufacture, a stable solid infusible, unfractured structure in the form of a sheet or membrane comprising a coherent matrix of an insoluble, infusible copolymer of a polyvinyl aromatic hydrocarbon and a monovinyl aromatic hydrocarbon with a hydrolyzable organic synthetic fabric embedded therein, sulfonate groups being chemically attached to the aromatic nuclei of said matrix, said copolymer being in gel relationship with a solvating liquid which presents a continuous phase throughout said gel, said fabric being a hydrolyzable organic polymer selected from the class consisting of polynitriles and polyesters.

9. A sulfonating agent for producing cation exchange membranes from cross-linked polymerizates having a reinforced backing of a synthetic organic fabric, said fabric containing hydrolyzable organic polymerizates belonging to the class consisting of polynitriles and polyesters, comprising: a solution of liquid sulfur trioxide in a chlorinated aliphatic solvent and a compound selected from the group consisting of benzoic acid and the derivatives thereof as listed in the Table I of the specification, said benzoic acid constituent being in a ratio of about one to two mols per mol of sulfur trioxide, in a chlorinated aliphatic hydrocarbon solvent.

References Cited in the file of this patent

UNITED STATES PATENTS

| 2,616,936 | Mammen | Nov. 4, 1952 |
| 2,704,295 | Gilbert | Mar. 15, 1955 |
| 2,731,411 | Clarke | Jan. 17, 1956 |
| 2,764,576 | Blaser | Sept. 25, 1956 |
| 2,783,273 | Verley | Feb. 26, 1957 |